United States Patent
Takihiro et al.

(10) Patent No.: US 7,751,394 B2
(45) Date of Patent: Jul. 6, 2010

(54) MULTICAST PACKET RELAY DEVICE ADAPTED FOR VIRTUAL ROUTER

(75) Inventors: Masatoshi Takihiro, Tokyo (JP); Tetsuro Yoshimoto, Kokubunji (JP); Kengo Ijima, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 1555 days.

(21) Appl. No.: 11/030,101

(22) Filed: Jan. 7, 2005

(65) Prior Publication Data
US 2006/0002391 A1    Jan. 5, 2006

(30) Foreign Application Priority Data
Jun. 30, 2004   (JP) .............................. 2004-192530

(51) Int. Cl.
*H04L 12/28* (2006.01)
*H04J 3/26* (2006.01)
*G06F 15/173* (2006.01)

(52) U.S. Cl. ........................ 370/390; 370/401; 370/432; 709/238

(58) Field of Classification Search ................. 370/351, 370/401, 432, 390, 400; 709/238, 242
See application file for complete search history.

(56) References Cited

U.S. PATENT DOCUMENTS

| | | | |
|---|---|---|---|
| 6,397,260 B1 * | 5/2002 | Wils et al. ................... 709/238 |
| 6,438,612 B1 * | 8/2002 | Ylonen et al. ................ 709/249 |
| 7,161,904 B2 * | 1/2007 | Hussain et al. ............... 370/230 |
| 7,266,120 B2 * | 9/2007 | Cheng et al. ................. 370/390 |
| 7,308,503 B2 * | 12/2007 | Giraud et al. ................ 709/230 |
| 2002/0001310 A1 * | 1/2002 | Mai et al. .................... 370/390 |
| 2002/0067725 A1 * | 6/2002 | Oguchi et al. ............... 370/390 |
| 2004/0008694 A1 * | 1/2004 | Guo ....................... 370/395.52 |

FOREIGN PATENT DOCUMENTS

JP    2003-204346    12/2001

OTHER PUBLICATIONS

Office Action from the Japanese Patent Office dated May 12, 2009 in Japanese.

* cited by examiner

*Primary Examiner*—Nittaya Juntima
(74) *Attorney, Agent, or Firm*—Stites & Harbison PLLC; Juan Carlos A. Marquez, Esq.

(57) ABSTRACT

An object of the present invention is to solve a problem that when multicast is utilized in a network configured with virtual routers, traffic in the relay network is increased. According to the present invention, the number of multicast packets via the relay network is reduced by performing a multicast packet transfer across the virtual routers within the same router. Specifically, it is allowed to register in a multicast routing table held by each virtual router, a line interface identifier of another virtual router as outgoing line interface information, whereby multicast packet transfer from a virtual router to another virtual router is made possible. In order to specify a virtual router to share the multicast packet, each virtual router holds information to specify a virtual router having a line interface to receive the multicast traffic indicated by the multicast group address.

10 Claims, 16 Drawing Sheets

FIG. 6

| MULTICAST GROUP ADDRESS (6111) | UPLINK IF IDENTIFIER (6112) |
|---|---|
| MC ADDRESS 1 | 1 |
|  |  |

UPLINK INFORMATION

FIG. 7

| MULTICAST GROUP ADDRESS (1111) | VR NUMBER (1112) |
|---|---|
| MC ADDRESS 1 | 1 |
| MC ADDRESS 2 | 1 |
| MC ADDRESS 3 | 2 |
|  |  |

UPLINK VR INFORMATION

FIG. 8

MULTICAST ROUTING TABLE 112a

| MULTICAST GROUP ADDRESS (1121) | OUTGOING IF IDENTIFIER (1122) |
|---|---|
| MC ADDRESS 1 | 1 |
| | 2 |
| | 3 |
| | 4 |
| MC ADDRESS 2 | 1 |
| | |

Prior Art    FIG. 9A

MULTICAST ROUTING TABLE 612a

| MULTICAST GROUP ADDRESS | OUTGOING IF IDENTIFIER |
|---|---|
| MC ADDRESS 1 | 1 |
|  | 2 |
| MC ADDRESS 2 | 1 |
|  |  |

Prior Art    FIG. 9B

MULTICAST ROUTING TABLE 612b

| MULTICAST GROUP ADDRESS | OUTGOING IF IDENTIFIER |
|---|---|
| MC ADDRESS 1 | 3 |
|  | 4 |
|  |  |

FIG. 10

| INTERFACE IDENTIFIER (8211) | VR NUMBER (8212) |
|---|---|
| 1 | 1 |
| 2 | 1 |
| 3 | 2 |
| 4 | 2 |
|  |  |

VR CONFIGURATION INFORMATION

IGMPv2 MESSAGE

TYPE:
0 × 11 = QUERY
0 × 16 = REPORT
0 × 17 = LEAVE GROUP

MULTICAST ROUTING TABLE 912a

| MULTICAST GROUP ADDRESS | OUTGOING IF IDENTIFIER |
|---|---|
| MC ADDRESS 1 | 1 |
|  | 2 |
|  | INTERNAL LINE 92 |
| MC ADDRESS 2 | 1 |
|  |  |

FIG. 16B

MULTICAST ROUTING TABLE 912b

| MULTICAST GROUP ADDRESS | OUTGOING IF IDENTIFIER |
|---|---|
| MC ADDRESS 1 | 3 |
|  | 4 |
|  |  |

MULTICAST PACKET RELAY DEVICE ADAPTED FOR VIRTUAL ROUTER

CLAIM OF PRIORITY

The present application claims priority from Japanese application JP 2004-192530 filed on Jun. 30, 2004, the content of which is hereby incorporated by reference into this application.

FIELD OF THE INVENTION

The present invention relates to a network comprising a packet relay device with a function of virtual router, and more particularly, it relates to a system to reduce multicast traffic flowing within the network, by means of sharing the multicast traffic among multiple virtual routers in a single router.

BACKGROUND OF THE INVENTION

With speedup in access line, a demand for voice and/or video streaming service is increasing. Currently used streaming service employs a unicast system which transmits from a voice/video server, data packets respectively dedicated to multiple subscriber terminals. Therefore, the voice/video server is forced to transmit a large number of packets, causing problems such that data transmission load is high in the voice/video server, as well as increasing a load on a relay network which relays the large number of packets.

In view of the situation above, telecommunication carriers, such as CDSP (content delivery service provider), and ISP (Internet Service Provider), now consider employing multicast system for the voice/video streaming service. In the multicast system, the voice/video server transmits only one data packet to multiple subscriber terminals, and a packet relay device within a relay network copies the data packet as appropriate, thereby executing a packet transfer to the multiple subscriber terminals. Therefore, the number of packets transmitted by the voice/video server is suppressed to a small number, and the load onto the server can be reduced. Furthermore, the number of packets flowing in the relay network is also suppressed to a small number and the load onto the relay network can be reduced as well.

In the meantime, the telecommunication carriers may construct a network employing a virtual router (hereinafter, referred to as "VR"), for the purpose of reducing a cost in building the network or separating traffic among subscribers. VR is a technique to configure a function of multiple virtual routers within one packet transfer device. Since such function of multiple routers can be implemented with one packet transfer device, it is possible to reduce the number of installed routers in the circumstance where multiple routers are required at the same spot.

For example, as for multiple ISPs, ADSL (Asynchronous Digital Subscriber Line) line service provider or FTTH (Fiber To The Home) line service provider, for providing an access network to connect the ISPs and the subscribers, may be capable of providing a function of routers dedicated to the ISPs, respectively. Alternatively, a telecommunication carrier who offers a wide area IP network service called as IP-VAN (IP Virtual Private Network) allocates a VR to each of customers, thereby providing the VPN service without interference in traffic among customers and establishing communication within each customer only.

FIG. 2 shows a configuration of a conventional packet relay device in a form of functional block of VR, with which a network adapted for multicast transfer can be constructed, as well as VR function is being installed therein. The packet relay device as shown in FIG. 2 implements VR 61a and VR 61b. Each of the VRs is provided with UPLINK information 611a, 611b, multicast routing tables 612a, 612b, PIM 613a, 613b, IGMP PROXY 614a, 614b, and the like. Reference numerals 12a to 12d denote subscriber terminals, and they are connected to the packet relay device 6 via communication lines. Subscriber terminals requesting to participate in a multicast delivery target group transmit IGMP Report messages 13a to 13d to the packet relay device 6.

The packet transfer device which has received the IGMP Report messages refers to Uplink information using as a key a multicast group address included in each of the IGMP Report messages, selects an interface connected to a line being upstream of the multicast, and transmits to the upstream router a PIM protocol message to allow the terminal to participate in the multicast group. In FIG. 2, VR 61a and VR 61b respectively receive IGMP Report messages 13a, 13b and 13c, 13d, and transmit PIM protocol messages 13e and 13f to the upstream routers.

The multicast system has a function to reduce the load on the relay network, but there is a possibility the load on the relay network is increased if the multicast system is employed in the network utilizing a VR. In order to clarify a problem to be solved by the present invention, as a reference example, an example in which a network is constructed using the packet relay device as shown in FIG. 2 and data delivery in the network is preformed through multicast system will be described with reference to FIG. 3. In FIG. 3, multicast traffic 32 comprising data packets is delivered from the multicast server 3, via ISP 41a, router 2a, VR 61a and VR 61b, and via SP 41b, router 2b, VR 61c and VR 61d, respectively to the subscriber terminals 12a to 12d and 12e to 12h. Here, VR 61a and VR 61b are located within the packet relay device 6a, and VR 61c and VR 61d are located within the packet relay device 6b.

A multicast packet is copied by a router on a path from the multicast server to the subscriber terminal, and then the copy is delivered to the subscriber terminal. In FIG. 3, a data packet from the multicast server 3 is copied by a router (not illustrated) in the Internet 4 and delivered to the routers 2a and 2b. Subsequently, the copied data packets are delivered to VR 61a and VR 61c from the router 2a, and another copied data packets are delivered to VR 61b and VR 61d from the router 2b.

In the multicast delivery, it is desirable to carry out copying in a router located as close as possible to a subscriber, thereby reducing the number of data packets transferred within the network and also reducing the load onto the relay network. However, in the example of FIG. 3, the data packets belonging to the identical multicast delivery (packets having the same destination address and data) are redundantly delivered from the router 2a and the router 2b, to the VR 61a and VR 61b in the packet relay device 6a, and to the VR 61c and VR 61d in the packet relay device 6b.

The situation above occurs since the VRs with conventional function have to operate independently even if they are located within the same packet relay device, and the multicast traffic cannot be shared between the VRs. Therefore, as it is shown in FIG. 3, the router 2a and the router 2b have to transmit the multicast traffic to all the VRs within the packet relay devices 6a and 6b, increasing the load onto the relay network.

SUMMARY OF THE INVENTION

Considering the problem above, the object of the present invention is to provide a communications network when a multicast system is utilized in a network comprising a packet relay device mounting VR function, the communications network being capable of reducing the load onto a relay network lower than before, and a packet relay device which is capable of implementing the communications network.

When a network has been configured employing a packet transfer device with the VR function, for example, in the network having the configuration as shown in FIG. 3, in order to suppress to the minimum the number of multicast packets via the relay network 5, it is sufficient to transmit one packet to each of the packet relay devices 6a and 6b, from either of the routers 2a and 2b, the packet being copied within each of the packet relay devices 6a and 6b, shared between the VRs, and to transmit those copied packets to the subscriber terminals.

Therefore, in the present invention, packet transfer across the VRs within the packet relay device can be executed, thereby reducing the number of multicast packets via the relay network. Specifically, the present invention allows a multicast routing table held by each VR to register a line interface identifier of another VR as outgoing line interface information indicating a destination address of the packet. Here, the multicast routing table includes information comprising a combination of a multicast group address and multiple line interface identifiers. When the VR transfers a multicast packet, the VR refers to the multicast routing table using as a key the multicast group address held by the packet, and obtains an outgoing line interface identifier to transmit the packet.

In the case of conventional VR, each VR operates independently. Therefore, it has been imperative that the outgoing interface identifier of the multicast routing table held by each VR corresponds to a line interface identifier belonging to the VR itself which holds the multicast routing table. On the other hand, the VR according to the present invention allows an interface identifier indicating a line interface of another VR to be registered as an outgoing line interface identifier. Accordingly, a multicast packet received by an arbitrary one VR within the same packet relay device can be shared among multiple VRs within the same relay device.

By configuring a network by employing the packet relay device implementing the features above, traffic in multicast packet transfer is concentrated, whereby the traffic volume can be reduced than before. Internal configuration of the packet relay device as described above and details of a packet transfer method will be explained in the following preferred embodiments of the present invention.

According to the present invention, as for packet relay devices arranged dispersedly in subscriber accommodation stations or the like, it is possible to share the multicast traffic among VRs within a single packet relay device, thereby reducing the multicast traffic in a multicast packet relay network.

BRIEF DESCRIPTION OF THE DRAWINGS

FIG. 6 shows Uplink information;

FIG. 7 shows Uplink VR information;

FIG. 8 shows a multicast routing table of the router adapted for VR according to the present invention;

FIGS. 9A and 9B show multicast routing tables of the existing router adapted for VR;

FIG. 10 shows VR configuration information;

FIGS. 16A and 16B show multicast routing tables of a router adapted for VR according to another embodiment of the present invention.

DETAILED DESCRIPTION OF THE PREFERRED EMBODIMENTS

First Embodiment

Figure 1:
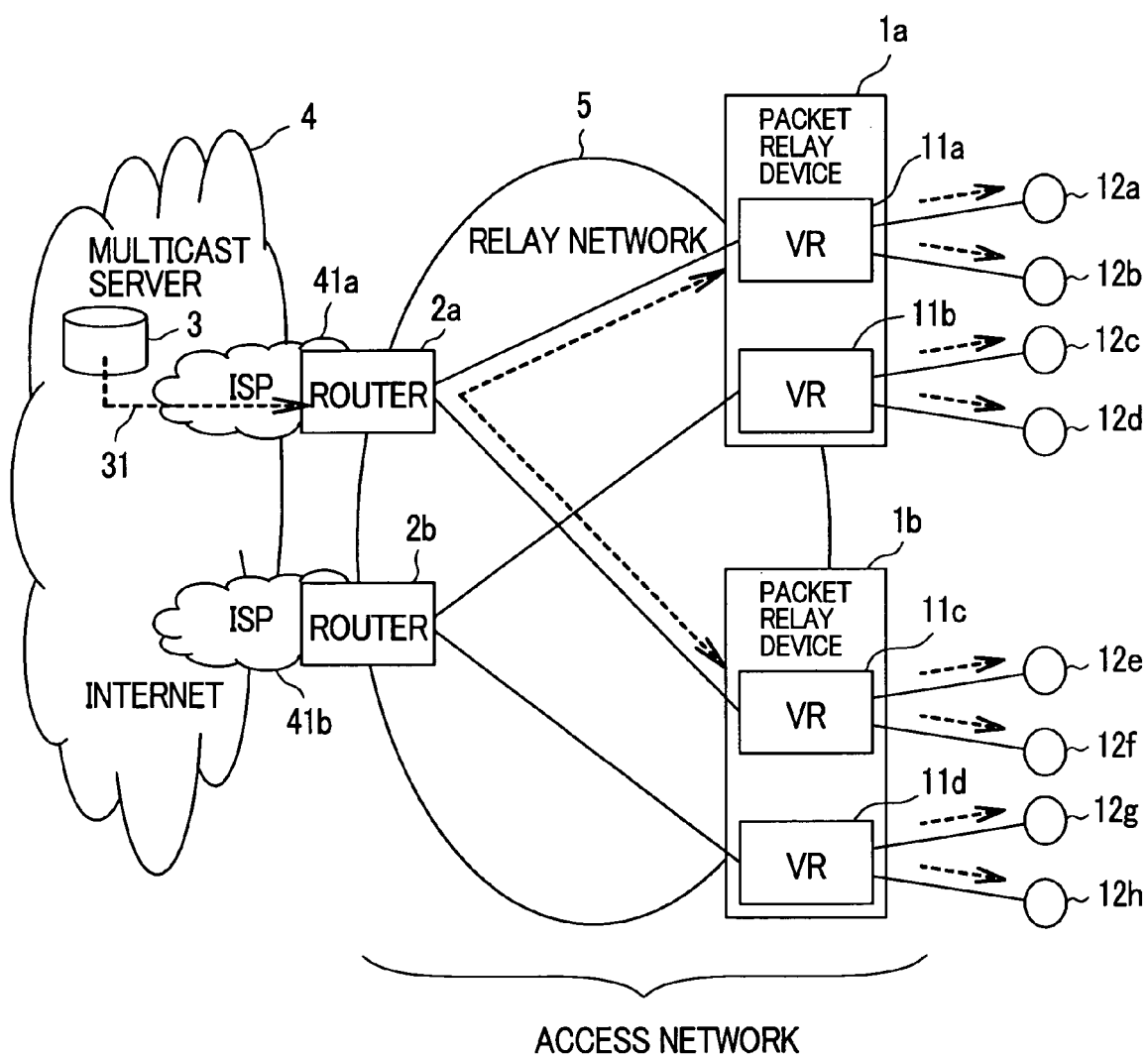
FIG. 1 is a schematic diagram showing an example of multicast delivery through an access network employing a router adapted for VR according to the present invention.

Hereinafter, with reference to the accompanying drawings, preferred embodiments of the present invention will be explained. FIG. 1 is a configuration diagram of Internet access network (hereinafter, referred to as "access network") which has been constructed by applying packet relay devices 1a, 1b according to the present embodiment, to routers for accommodating subscriber circuits. The packet relay devices 1a, 1b are arranged dispersedly in a subscriber accommodation station on the subscriber side in the access network, and the packet relay devices respectively accommodates subscriber terminals 12a to 12d, and 12e to 12h. In FIG. 1, the packet relay device 1a includes therein VR 11a and VR 11b, and the packet relay device 1b includes therein VR 11c and VR 11d. The VR 11a and VR 11c are allocated to ISP 41a, and the VR 11b and VR 11d are allocated to ISP 41b.

With this configuration, it is not necessary for the subscriber accommodation station to install routers with respect to each ISP, whereby the number of installed routers are reduced. The ISP 41a is connected to VR 11a in the packet relay device 1a and VR 11c in the packet relay device 1b, via the router 2a and the relay network 5. The ISP 41b is connected to VR 11b in the packet relay device 1a and VR 11d in the packet relay device 1b, via the router 2b and the relay network 5. The VR 11a accommodates the subscriber terminals 12a and 12b, the VR 11b accommodates the subscriber terminals 12c and 12d. Furthermore, VR 11c accommodates the subscriber terminals 12e and 12f, the VR 11d accommodates the subscriber terminals 12g and 12h. The relay network 5 may be a wide area network, for example, constructed by ATM (Asynchronous Transfer Mode) network and the like.

FIG. 1 shows an example that multicast server 3 within the Internet 4 performs multicast data delivery to the subscriber terminals 12a to 12h. Multicast traffic 31 from the multicast server 3 goes through the ISP 41a, router 2a, relay network 5, and then it is transmitted to the VR 11a in the packet relay device 1a, and to the VR 11c in the packet relay device 1b. Subsequently, the multicast traffic 31 is copied between the VR 11a and VR 11b within the packet relay device 1a, and also it is copied between the VR 11c and VR 11d within the packet relay device 1b. Then, the copied multicast traffic is delivered from VR 11a, VR 11b, VR 11c, and VR 11d to the subscribers 12a to 12h.

Here are two multicast traffic flows which pass through the relay network 5, i.e., a traffic flow from the router 2a to the VR 11a in the packet relay device 1a, and a traffic flow from the router 2a to the VR 11c in the packet relay device 1b. In general, when there is m number of packet relay devices, the number of multicast traffic flows passing through the relay network 5 is m. It is to be noted that multiple number of VRs for receiving the multicast packet may exist among the VRs mounted on the packet relay device 1a or 1b as shown in FIG. 1. Furthermore, VR prepared for receiving is not fixed constantly, and it may be changed according to a type of the multicast packet. In FIG. 7, for example, the VR for receiving the multicast addressed to MC address 1 is defined as VR1. When there is a request from a subscriber to participate in the multicast addressed to MC Address 1, Uplink VR information is referred to, so as to inform an upstream router of the request. Consequently, the VR1 becomes the VR for receiving the multicast. As to the Uplink VR information, there will be a detailed explanation in the following, with reference to FIG. 7.

Figure 3:
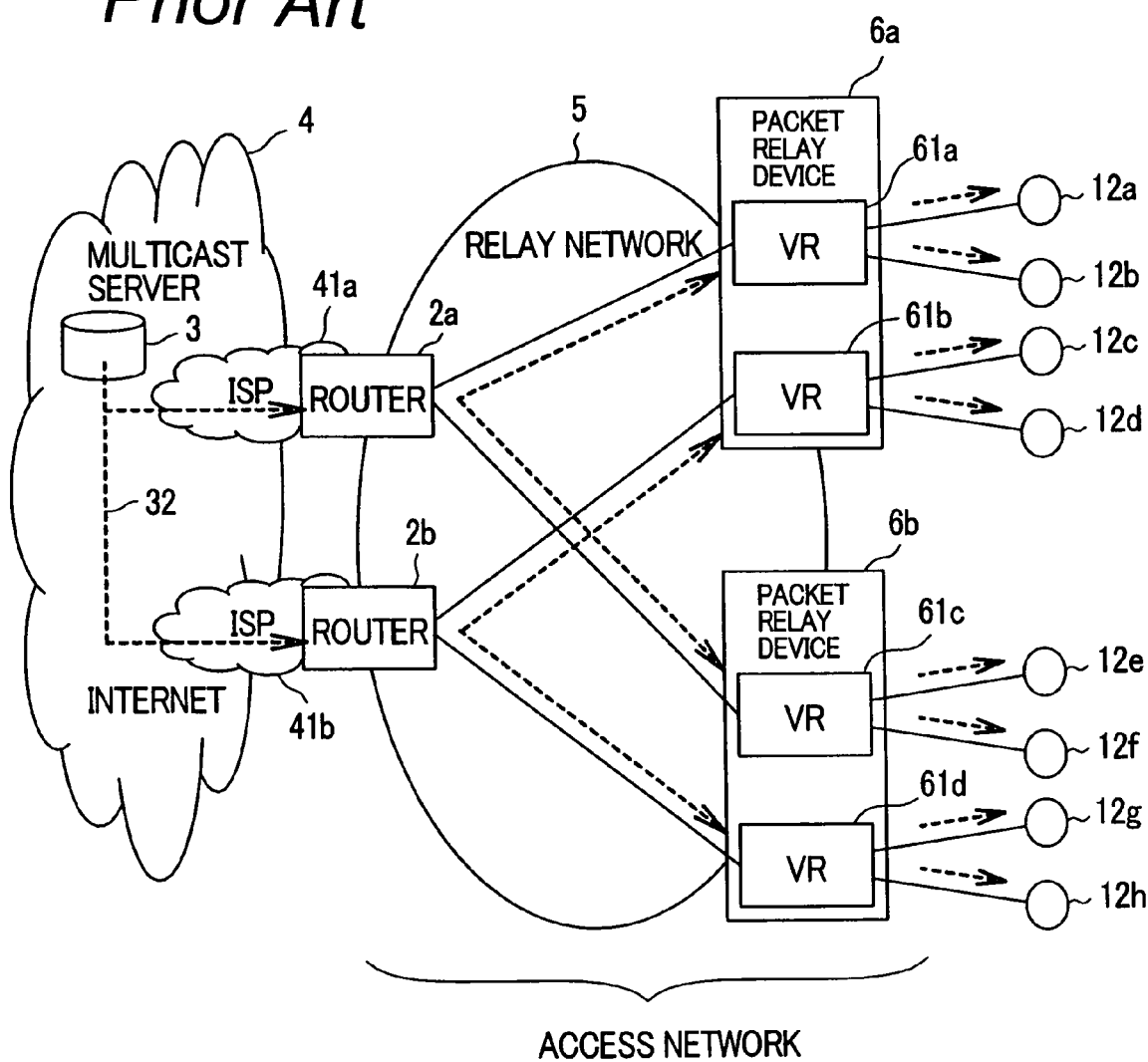
FIG. 3 is a schematic diagram showing an example of multicast delivery through an access network employing an existing router adapted for VR.

In order to see an effect brought about by reducing the traffic in the network as shown in FIG. 1, traffic volume in the network as shown in FIG. 3 will be explained as a comparative example. FIG. 3 is a configuration diagram showing an access network constructed by applying to a subscriber accommodation station, conventional packet relay devices 6a, 6b which do not have VR function as provided by the present embodiment. The network configuration in FIG. 3 is the same as that of FIG. 1, except the packet relay devices 6a and 6b. Similar to the case of FIG. 1, there is shown an example to perform multicast data delivery from the multicast server 3 within the Internet 4 to the subscriber terminals 12a to 12h. Here, the multicast traffic 32 from the multicast server 3 branches out within the Internet 4, and each reaches ISP 41a and ISP 41b.

From the ISP 41a, the multicast traffic 3.2 goes through the router 2a and the relay network 5, and then it is transmitted to the VR 61a in the packet relay device 6a and to the VR 61c in the packet relay device 6b. From the ISP 41b, the multicast traffic is transmitted to the VR 61b in the packet relay device 6a, and the VR 61d in the packet relay device 6b. Then, the multicast traffic is delivered to the subscriber terminals 12a and 12b from the VR 61a in the packet relay device 6a, to the subscriber terminals 12c and 12d from the VR 61b, to the subscriber terminals 12e and 12f from the VR 61c in the router 6b, and to the subscriber terminals 12g and 12h from the VR 61d.

Here, there are four multicast traffic flows which pass through the relay network 5, i.e., a traffic flow from the router 2a to the VR 61a, a traffic flow from the router 2a to the VR 61c, a traffic flow from the router 2b to the VR 61b, and a traffic flow from the router 2b to the VR 61d. In general, if there is m number of packet relay devices and n number of ISPs, the number of multicast traffic flows passing through the relay network 5 is m×n.

As described above, it is found that by constructing a network by employing the packet relay devices 1a, 1b having the multicast function according to the present embodiment, the number of traffic flows through the relay network 5 can be reduced to m from m×n.

Figure 4:
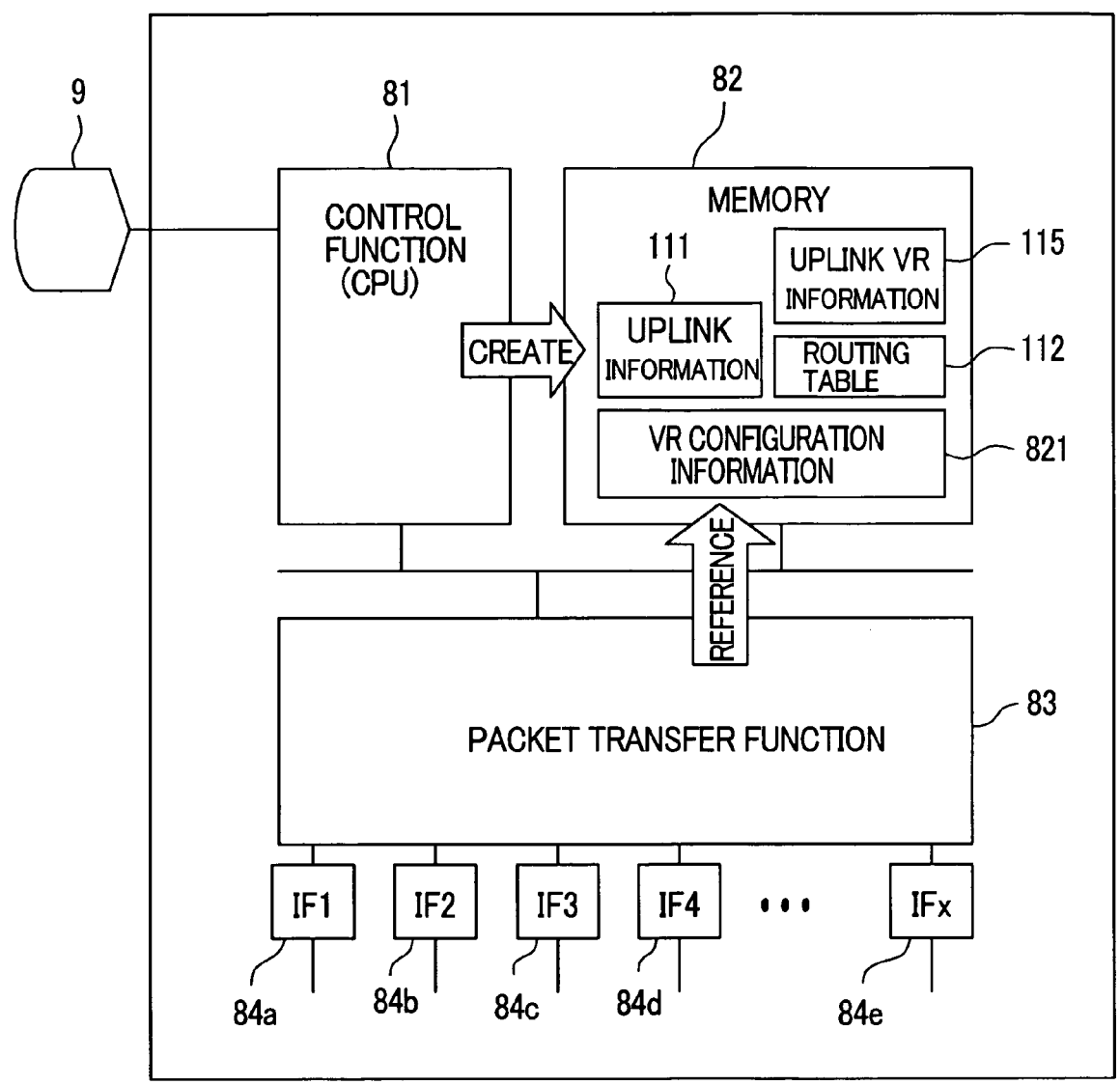
FIG. 4 is a schematic diagram showing a hardware configuration of the router adapted for VR according to the present invention.

Next, a configuration of the packet relay device according to the present embodiment will be explained. FIG. 4 shows a schematic diagram of a hardware configuration of the packet relay device 1a or 1b according to the present embodiment. The packet relay device according to the present embodiment comprises a control function unit 81, a memory unit 82, and a packet transfer function unit 83, and these units are connected via a control bus. The memory unit 82 holds the aforementioned Uplink information 111, the multicast routing table 112, and Uplink VR information 115. Furthermore, the memory unit 82 holds VR configuration information 821 indicating VR configuration. When the packet transfer function unit 83 receives a multicast data packet via the line interface units 84a to 84e, the packet transfer function unit 83 refers to the multicast routing table 112, and transfers the data packet to the line interface indicated by the outgoing IF identifier in the table. At this stage, if there are multiple line interfaces indicated by the outgoing IF identifier, the packet transfer function unit 83 copies the data packet and thus copied packets are transmitted from those line interfaces respectively.

Figure 5:
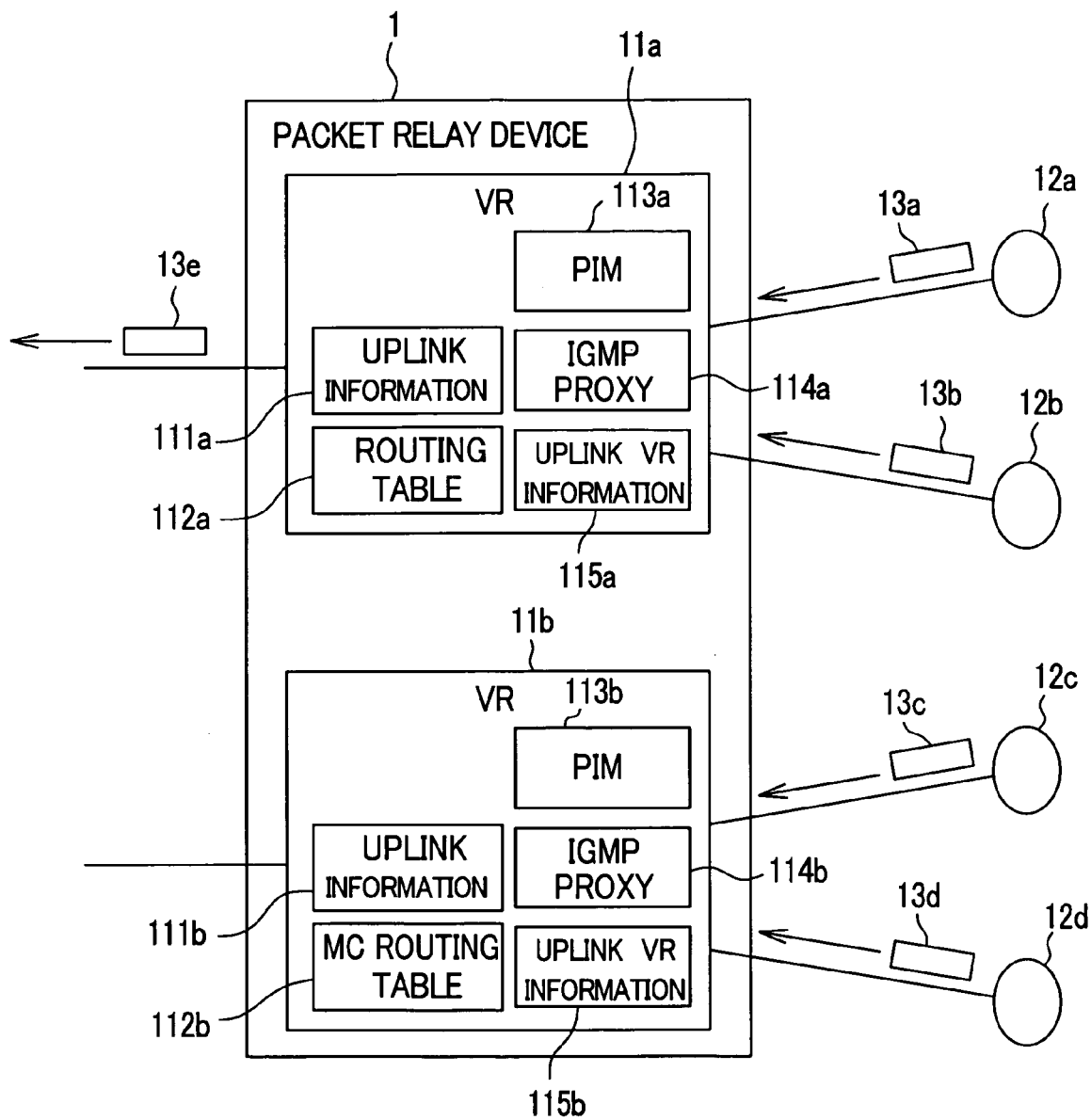
FIG. 5 is conceptual diagram of the router adapted for VR according to the present invention.

FIG. 5 shows a functional block diagram of the multicast packet relay device according to the present embodiment. In addition, FIG. 5 shows a procedure for a subscriber terminal to participate in a target of multicast delivery in the packet relay device 1 according to the present embodiment. The packet relay device according to the present embodiment includes VRs 11a and 11b. The VR 11 comprises Uplink information 111a, multicast routing tables 112a, PIM-SM function 113a, IGMP Proxy function 114a, and Uplink VR information 115a. The VR 11b comprises Uplink information 111b, multicast routing tables 112b, PIM-SM function 113b, IGMP Proxy function 114b, and Uplink VR information 115b. As the outgoing interface identifier defined in each of the multicast routing tables 112a, 112b, it is possible to register not only a line interface identifier belonging to the VR holding the multicast routing table, but also a line interface identifier of arbitrary VR.

The packet relay devices 1a, 1b according to the present embodiment hold Uplink VR information to indicate a VR which shares a multicast packet. The Uplink VR information is information comprising a combination of multicast group address and VR identifier. Here, the VR identifier is information which specifies a VR having a line interface for receiving a multicast packet holding the multicast group address. In other words, it is information which indicates a VR having a line interface serving as upstream of the multicast. In the packet relay device according to the present embodiment, the Uplink VR information is appropriately set in each VR, thereby allowing the multicast packet to be shared among the VRs.

Transferring multicast packets is carried out on the basis of the multicast routing table. A VR which received a multicast delivery request transmitted by a subscriber terminal notifies an upstream router of the request, and simultaneously records in the multicast routing table a line interface identifier to connect the multicast group address with the subscriber terminal, whereby the multicast routing table is created. The multicast group address is included in the multicast delivery request.

In addition, when the VR implemented by the packet relay devices 1a, 1b according to the present embodiment receives a multicast delivery request, the VR refers to the Uplink VR information using as a key the multicast group address included in the request, and passes to a VR indicated by thus obtained VR identifier, the multicast delivery request and a line interface identifier which received the request. The VR which has been passed the multicast delivery request and the line interface identifier, processes the multicast delivery request, and registers in the multicast routing table the multicast group address and the line interface identifier thus passed. Then, the VR performs multicast protocol processing such as IGMP (Internet Group Management Protocol) Proxy function, or PIM (Protocol Independent Multicast), and newly creates a multicast delivery request, followed by transmitting the request from the line interface being an upstream of the multicast.

FIG. 6 shows Uplink information 111a, 111b respectively held by the VRs 11a and 11b in the packet relay device 1 according to the present embodiment. The Uplink information is information indicating a line as a multicast upstream, and comprises a combination of multicast group address 6111 and Uplink interface identifier 6112.

FIG. 7 shows an example of Uplink VR information 115a, 115b respectively held by the VRs 11a, 11b in the packet relay device 1 according to the present embodiment. The Uplink VR information comprises a combination of multicast group address 1111 and VR number 1112. Upon receipt of an IGMP Report message from a subscriber terminal, each VR refers to the Uplink VR information using as a key the multicast group address set in the Group Address field of the IGMP Report message, identifies a VR (upstream VR) for receiving the multicast traffic indicated by the multicast group address, and passes to thus identified VR, the IGMP group message and an identifier of the line interface which received the message.

Subsequently, in the VR which received the IGMP Group message and the line interface identifier, PIM protocol processing or IGMP Proxy protocol processing is performed. FIG. 5 shows that the VR 11b which received the IGMP Report messages 13c, 13d refer to the Uplink VR information 114b, selects the VR 11a as an upstream VR, and a PIM protocol message or IGMP Report message 13e is transmitted.

The packet relay device according to the present embodiment performs a multicast control processing by use of the Uplink VR information as described above, whereby a multicast routing table across the VRs is created. FIG. 8 shows an example of the multicast routing table 112a of the VR 11a. In FIG. 8, the multicast group address MC Address 1 is associated with the transmission interfaces, line interface identifiers 1, 2, belonging to the VR 11a, and the line interface identifiers 3, 4, belonging to the VR 11b. The VR 11a transfers a multicast packet according to this routing table.

Figure 2:
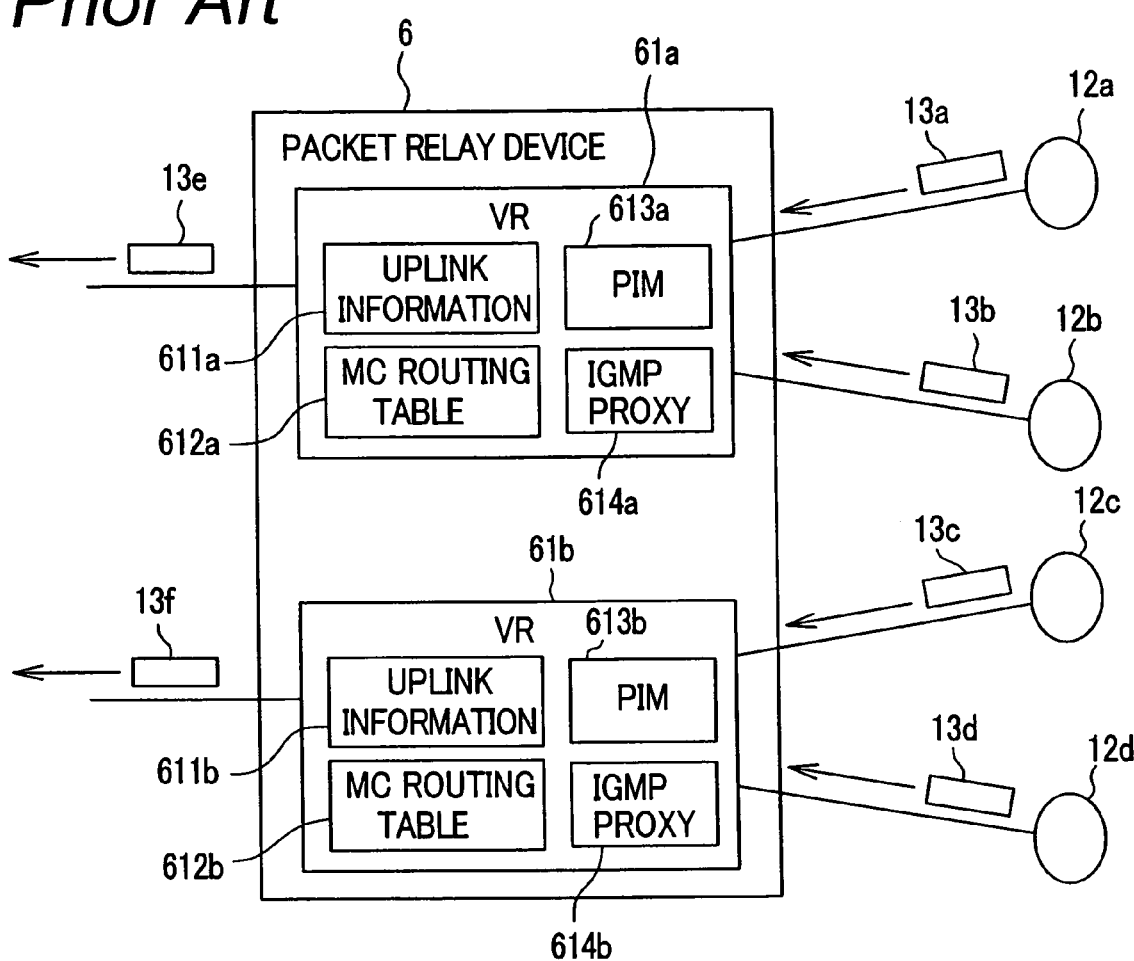
FIG. 2 is a conceptual diagram showing an existing router adapted for VR.

For comparison purposes, FIGS. 9A and 9B show an example of multicast routing tables which are used in a conventional packet relay device 6 as shown in FIG. 2. In this multicast routing table, the multicast group address 6122 is associated with multiple outgoing interface identifiers 6123 serving as transmission interfaces of the multicast packet.

In the conventional multicast routing table, only the line interface belonging to the VR which holds the multicast routing table can be specified as the transmission interface. On the other hand, the multicast routing table according to the present embodiment can specify a line interface belonging to a VR other than the VR which holds the multicast routing table. Accordingly, multicast transfer across VRs is made possible.

FIG. 10 shows VR configuration information 821. The VR configuration information 821 comprises a combination of interface identifier 8211 and VR number 8212, and indicates a correspondence between the line interface and VR. For example, FIG. 10 shows that the interfaces 1 and 2 belong to the VR having the VR number 1, and the interfaces 3 and 4 belong to the VR having the VR number 2. As shown in FIG. 4, the control function unit 81 is connected to the management terminal 9. An administrator of the packet relay device uses the management terminal 9, and sets VR configuration information 821, Uplink information 111, and Uplink VR information 115. The packet transfer function 83 has line interface units 84a to 84e, copies multicast packets received from those line interfaces as appropriate, with reference to the multicast routing table 112, and then, transfers those copied packets to another line interfaces.

Figure 11:
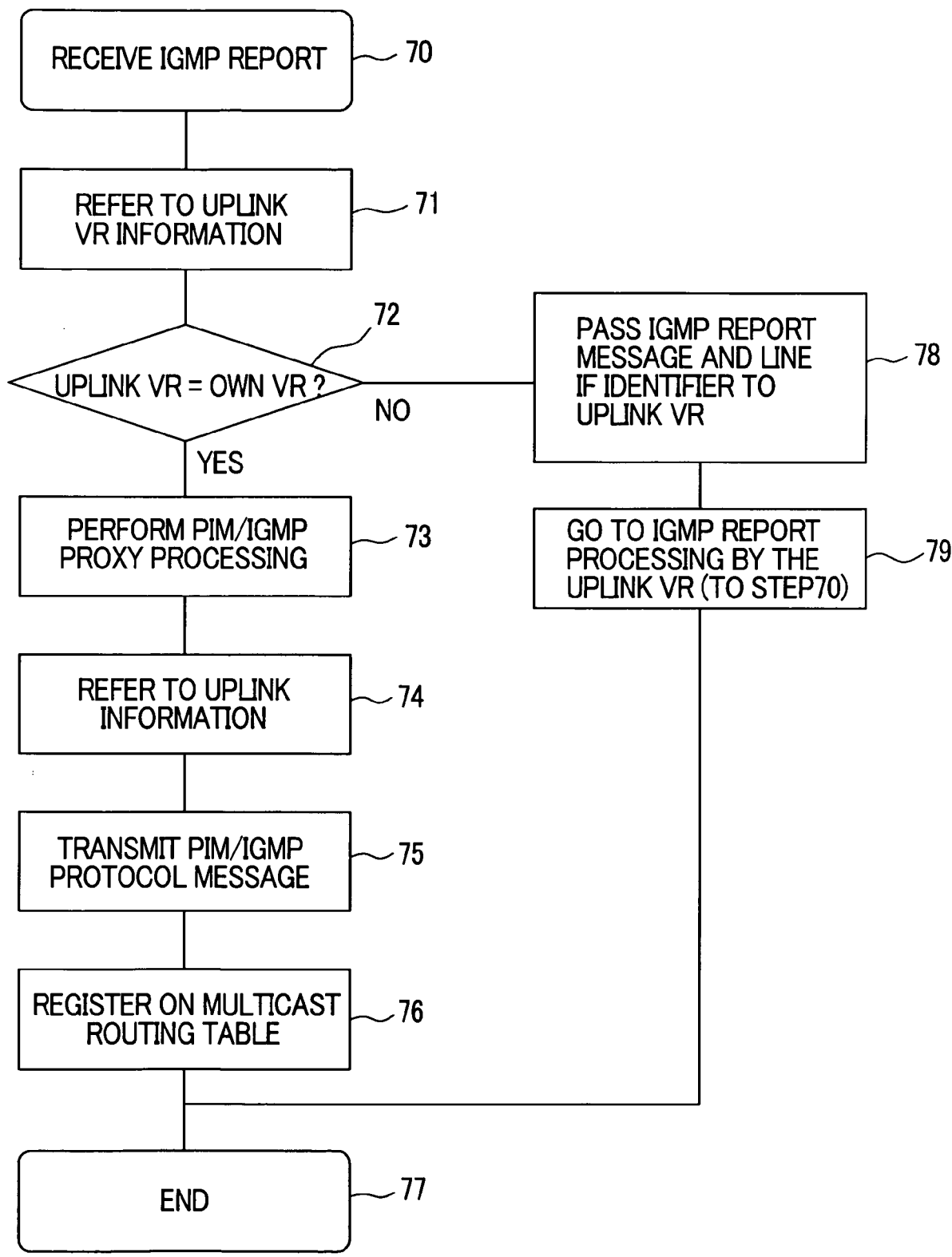
FIG. 11 shows an operational flowchart of the router adapted for VR according to the present invention.

FIG. 11 shows a flow diagram to provide a summary of processing for creating the multicast routing table in the packet relay device 1 according to the present embodiment. By use of the flow diagram, operations of the VR in the packet relay device 1 according to the present embodiment will be explained in the following.

The VR that has received an IGMP Report message (70) refers to the Uplink VR information (71). If the Uplink VR corresponds to own VR, it performs PIM protocol processing or an IGMP Proxy processing (72, 73). At this stage, the VR refers to the Uplink information (74), and transmits a PIM protocol packet or an IGMP Report message to an upstream line (75). In addition, the VR registers in the multicast routing table, an identifier of the line interface which received the IGMP Report message, as an outgoing interface identifier associated with the multicast group address included in the IGMP Report message (76).

On the other hand, if the Uplink VR is another VR, the IGMP Report message thus received is passed to an upstream VR together with the line interface identifier which received the IGMP Report message (72, 78). In the upstream VR, a processing for receiving the IGMP Report message is newly performed, by use of the IGMP Report message which has been passed (79).

According to the processing as described above, the multicast traffic is shared among VRs within the same packet relay device, and the multicast delivery as shown in FIG. 1 is carried out. In FIG. 1, at first, the router 2a transmits multicast packets to the VR 11a in the router 1a and to the VR 11c in the router 1b. Subsequently, multicast delivery is performed from the VR 11a to the subscriber terminals 12a, 12b accommodated in the VR 11a, and to the subscriber terminals 12c, 12d accommodated in the VR 11b. Furthermore, multicast delivery is performed from the VR 11c to the subscriber terminals 12e, 12f accommodated in the VR 11c, and to the subscriber terminals 12g, 12h accommodated in the VR 11d.

Figure 12:
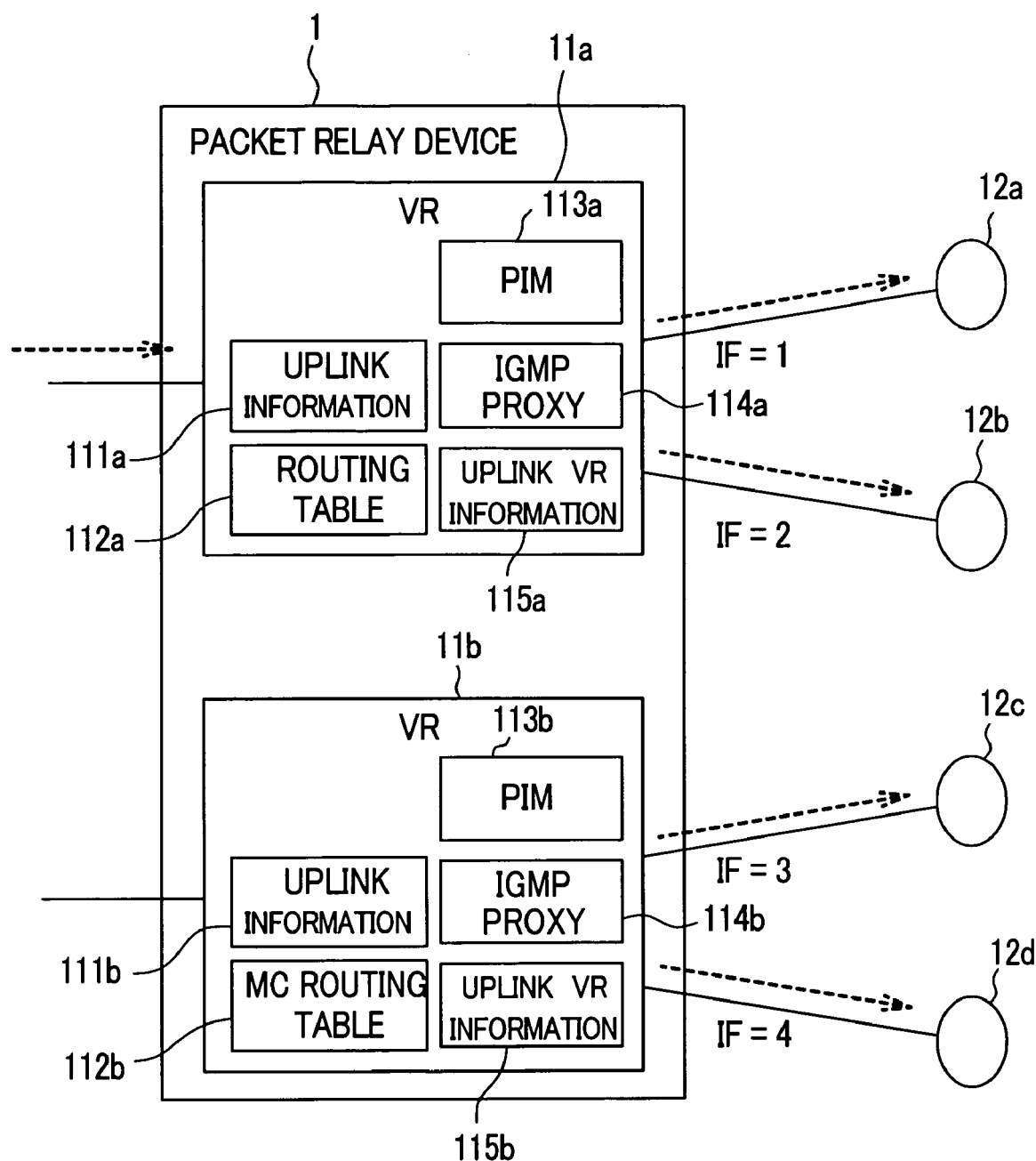
FIG. 12 shows a conceptual diagram of multicast by the router adapted for VR according to the present invention.

FIG. 12 shows a situation where multicast packets are transmitted to the subscriber terminals 12c, 12d accommodated in the VR 11b, in addition to the subscriber terminals 12a, 12b accommodated in the VR 11a. Next, a method for a subscriber terminal to participate in a multicast group in the multicast packet transfer will be explained.

Figure 13:
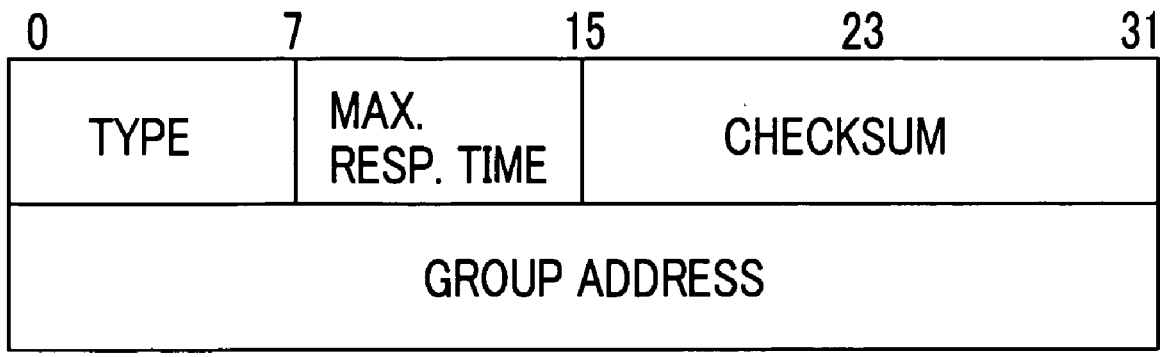
FIG. 13 shows an IGMP message format.

FIG. 13 shows a format of IGMP Ver. 2 message. The IGMP Ver. 2 is a multicast control protocol between a subscriber terminal and a packet relay device, currently used most frequently. The IGMP Ver. 2 message includes Type field, Maximum Response Time field, Checksum field, and Group Address field. The IGMP Report message includes a value of 0x16 in the Type field, and multicast group address indicating a participating subscriber terminal group is set in the Group Address field. It is to be noted that Checksum is information used for data error detection. It is also to be noted that the Maximum Response Time field is not used for the IGMP Report message.

As another type of IGMP message, there are IGMP Leave Group message and IGMP Query message. When a subscriber terminal leaves from a multicast group, the address of the multicast group is set in the Group Address field in the IGMP Leave group message and it is transmitted to the packet relay device. The IGMP Leave Group message has a value of 0x17 in the Type field, and the Max Response Time field is not used.

The packet relay device accommodating a subscriber terminal transmits an IGMP Query message to the subscriber terminal on regular basis. The subscriber terminal receives the IGMP Query message, and if the multicast group address in the Group Address field of the IGMP Query message indicates the multicast subscriber terminal group to which the subscriber terminal itself belongs, the subscriber terminal transmits an IGMP Report message. As thus described, the packet relay device accommodating the subscriber terminal prompts the subscriber terminal to transmit an IGMP Report message, thereby checking a participation status of the subscriber terminal in the multicast group. The IGMP Query message has a value of 0x11 in Type field, and in the Group Address field, there is set a multicast group address as to which it is inquired whether or not the terminal is participating. Furthermore, in the Max Response Time field, there is a setting of time period permitted until the IGMP Report message is returned from the subscriber terminal.

In order to implement the multicast function, the VR 11a and VR 11b within the packet relay device 1 includes respectively, PIM functions 113a, 113b or IGMP Proxy functions 114a, 114b, each being a multicast routing protocol to create a multicast routing table. The VR 11a and VR 11b further holds respectively, Uplink information 111a, 111b required for protocol operations, and the multicast routing tables 112a, 112b which are created with those protocols.

A procedure for creating the multicast routing table, according to PIM function or IGMP Proxy function will be explained in the following. The PIM functions 113a, 113b and the IGMP Proxy functions 114a, 114b are protocols to create the multicast routing table. Upon receipt of an IGMP Report message from the subscriber terminal, the PIM function refers to Uplink information using as a key the multicast group address included in the IGMP Report message, selects an interface which is connected to a line being upstream of the multicast, and transmits a PIM protocol message to the upstream router for allowing the terminal to participate in the multicast group. In FIG. 5, the VR 11a receives the IGMP Report messages 13a and 13b, and VR 11b receives the IGMP Report messages 13c and 13d, and PIM protocol message 13e is transmitted to the upstream router. Here, as for the VR 11a, the Uplink VR described in the Uplink VR information indicates its own VR. Therefore, the VR 11a refers to the Uplink information and transmits the PIM protocol message directly from its own VR to the upstream router. However, as for the VR 11b, since the Uplink VR described in the Uplink VR information indicates the VR 11a, the PIM protocol message is not transmitted to the upstream router directly from the VR 11b itself.

Similarly, when the IGMP Proxy function receives an IGMP Report message from the subscriber terminal, it refers to the Uplink VR information and Uplink information using as a key the multicast group address included in the IGMP Report message, selects an interface connected to the upstream line of the multicast, and transfers the IGMP Report message from the subscriber terminal on the current line to the upstream router.

There may be considered following modes for setting the Uplink information, i.e., manually setting by an administrator, and automatically setting of a line being the shortest route to the multicast server on the basis of unicast routing information. Since each VR operates as an independent router, Uplink interface identifier which is set in the Uplink interface information 6112 has to be an identifier indicating a line interface belonging to that VR. In addition, the Uplink VR information is information set by the administrator.

Figure 14:
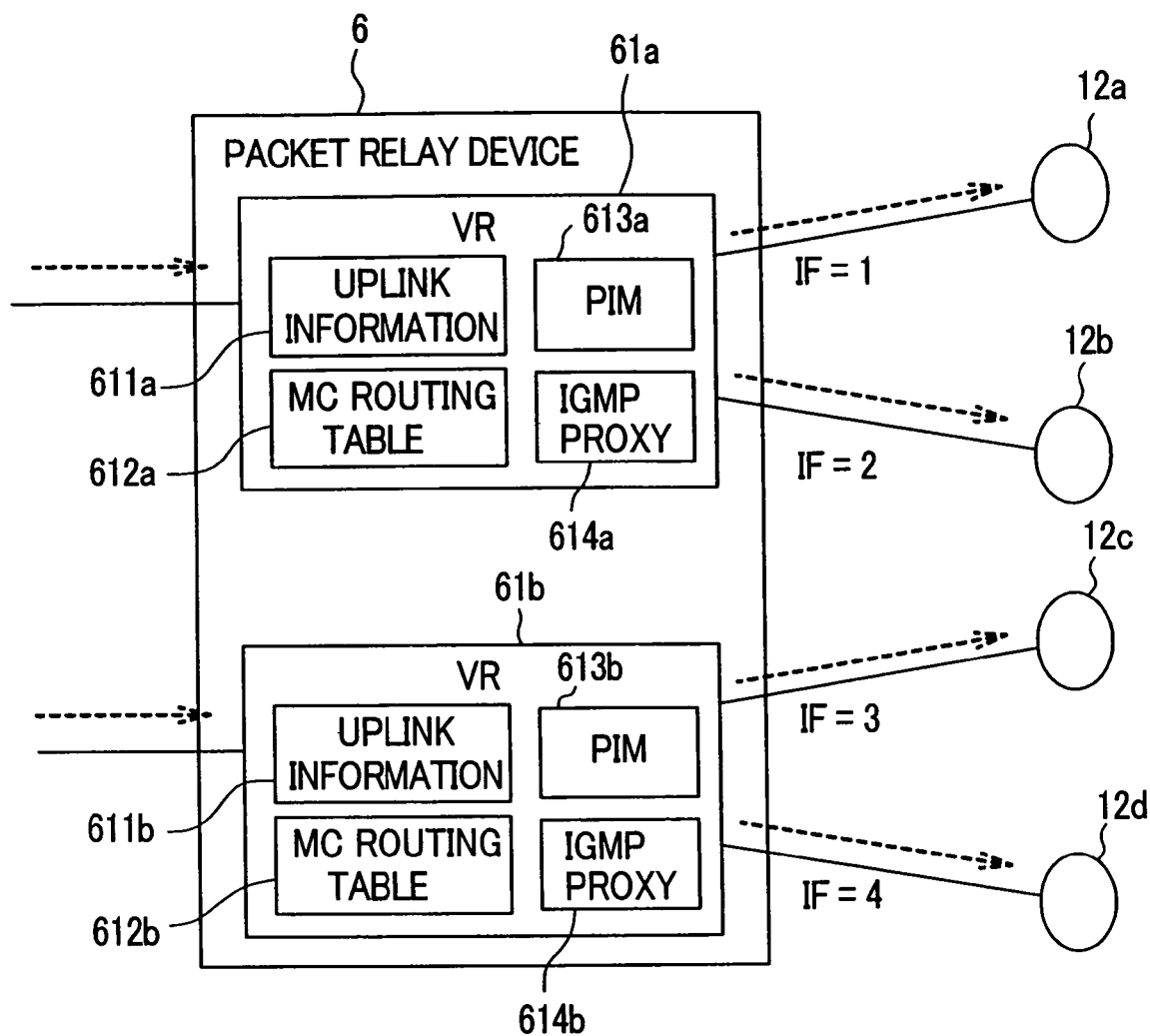
FIG. 14 shows a conceptual diagram of multicast by the existing router adapted for VR.

In the conventional VR, the multicast routing table is managed independently with respect to each VR. In FIG. 2, the VR 61a has the multicast routing table 612a, and the VR 61b has the multicast routing table 612b. Here, since each VR operates independently, the outgoing interface identifier indicates any of the line interfaces belonging to the VR holding the multicast routing table. As shown in FIG. 14, the VR 61a and VR 61b within the router 6 transfer the multicast packets according to the respective multicast routing tables.

On the other hand, in the VR according to the present embodiment, the multicast routing table is managed across the VRs. FIG. 5 and FIG. 12 show that the VR 11a holds the multicast routing table 112a, and the VR 11b holds the multicast routing table 112b. As shown in FIG. 12, it is possible for any of the multicast routing tables to have an identifier indicating a line interface belonging to a VR which is different from the VR having that multicast routing table. Accordingly, as shown in FIG. 5 and FIG. 12, the VR 11a and VR 11b within the router 1 are allowed to transfer the multicast packets across the VRs.

In FIG. 6, the multicast routing table using as a key the multicast group address is illustrated as an example. However, when a protocol which can specify a multicast server is used, such as IGMP v3, PIM-SSM (Source Specific Multicast), a combination of a sender address (address of the multicast server) and the multicast group address is used as a key.

With the packet relay device which performs multicast packet transfer across the VRs, it is possible to carry out a multicast transfer service without increasing the load of the network data packet transfer, even in the network configuration employing VRs.

Second Embodiment

Figure 15:
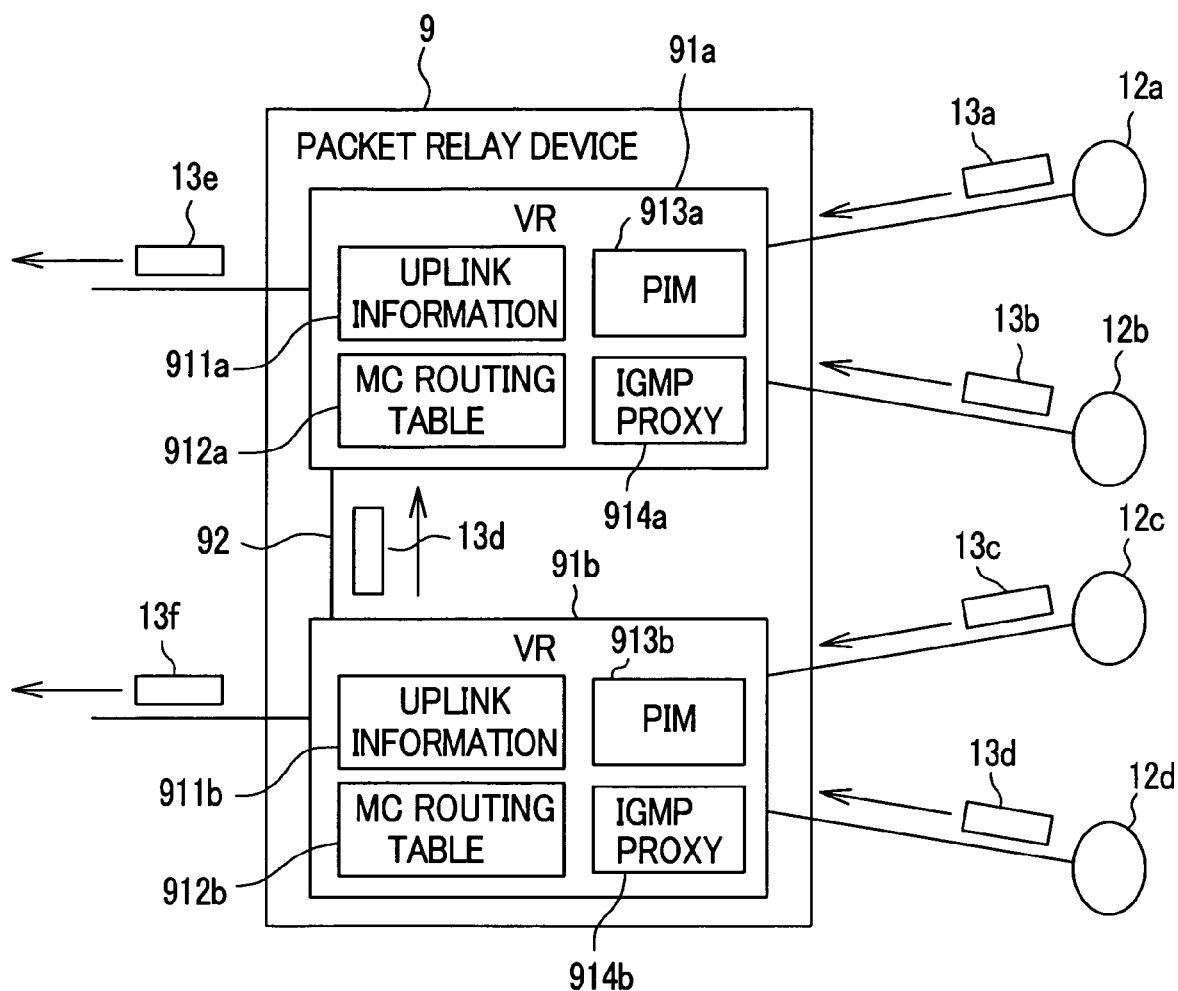
FIG. 15 shows a conceptual diagram of a router adapted for VR according to another embodiment of the present invention.

In the present embodiment, a VR implementation method, in a type of internal link, will be explained. FIG. 15 shows a functional block diagram of the packet relay device according to the present embodiment. In addition, the hardware configuration of the packet relay device according to the present embodiment can be implemented in the same configuration as shown in FIG. 4. The packet transfer device 9 used in the present embodiment has the same configuration as that of the conventional packet transfer device 6, except that the packet transfer device 9 has an internal line 92. In other words, the Uplink information 911a, 911b, multicast routing table 912a, 912b, PIM-SM functions 913a, 913b, IGMP Proxy functions 914a, 914b respectively correspond to Uplink information 611a, 611b, multicast routing tables 612a, 612b, PIM-SM functions 613a, 613b, and IGMP Proxy functions 614a, 614b of the conventional packet transfer device 6. The internal line 92 is a logical line to establish connection between the VRs. FIG. 15 shows that the internal line 92 connects the VR 91a and the VR 91b within the router 9.

Figure 17:
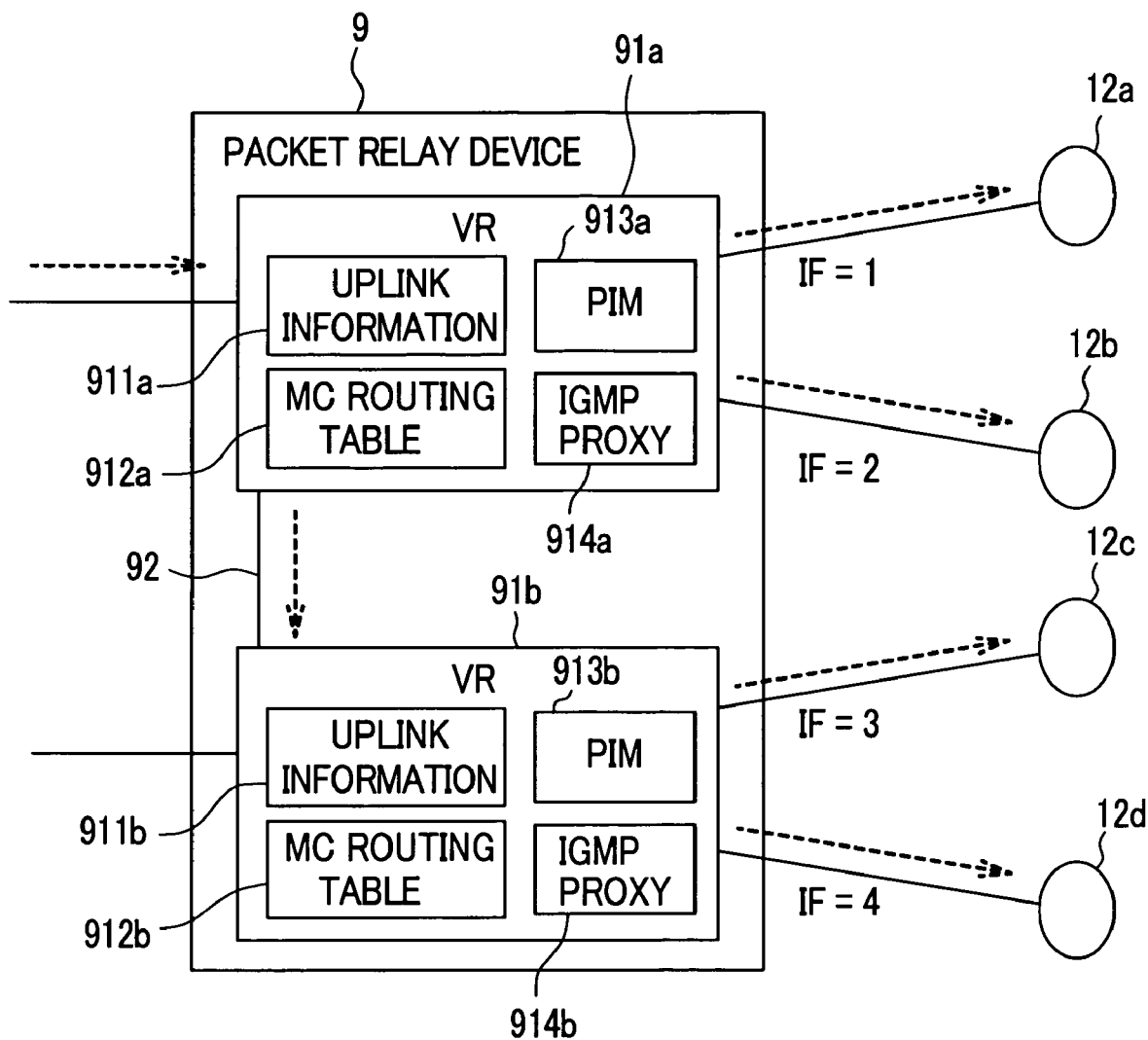
FIG. 17 shows a conceptual diagram of multicast by a router adapted for VR according to another embodiment of the present invention.

With reference to FIGS. 15, 16, and 17, an operation of the router adapted for VR according to the present embodiment will be explained. FIG. 15 shows that VR 91b holds Uplink information 911b which uses the internal line 92 as a line connecting to the upstream router, and uses the VR 91a as an upstream VR. In FIG. 15, the VR 91b receives IGMP Report messages 13c and 13d from the subscriber terminals 12c, 12d. The VR 91b which received the IGMP Report messages 13c and 13d performs PIM or IGMP Proxy protocol processing, and creates a multicast routing table. When the PIM function is used, the VR 91b transmits a PIM protocol message 13d to the VR 91a via the internal line 92. When the IGMP Proxy function is used, the VR 91b transmits an IGMP Report message to the VR 91a via the internal line 92. This processing is the same as the multicast protocol processing performed by a usual router.

Next, the VR 91a, which has received the PIM protocol message or the IGMP Report message from the VR 91b, performs a protocol processing according to the PIM function or IGMP Proxy function, as in the case of the usual router, and transmits the PIM protocol message or the IGMP Report message 13e to the upstream router.

FIG. 16A and FIG. 16B show the multicast routing tables 912a and 912b in the present embodiment, which are created respectively by the VR 91a and the VR 91b according to the procedure as described above. In the multicast routing table 912a, the internal line 92 is set in the interface information associated with the multicast group address MC Address 1, and this is a point different from the multicast routing table held by the existing router 6 adapted for VR. In the present embodiment, as shown in FIG. 17, the multicast routing tables 912a and 912b use the line interfaces 1, 2, 3, and 4, so as to transmit the multicast traffic flows to the subscriber terminals 12a, 12b, 12c, and 12d, respectively.

In the present embodiment, since an upstream VR is specified by use of the Uplink information, it is not necessary to specify the Uplink VR information, which is required in the first embodiment. Therefore, it is possible for a VR administrator to obtain an effect of the present invention, even if its operation is closer to the operation of a conventional router.

What is claimed is:

1. A packet relay device in which both a function of multiple virtual routers and multicast routing are implementable, comprising a line interface which accommodates a communication line, a packet transfer function unit which transfers a received packet, a memory unit, and a control unit, wherein, said memory unit stores, with respect to each of the virtual routers, upstream virtual router information indicating a virtual router which receives a multicast packet from another packet relay device, and a multicast routing table which is used for transmitting the multicast packet, said control unit has a function which sets up said upstream virtual router information and said multicast routing table, said upstream virtual router information is provided with a first field to store a multicast group address indicating a transfer destination of the multicast packet received from said line interface, and a second field to store identification information of the virtual router which receives the multicast packet, said multicast routing table is provided with a first field to store a multicast group address indicating a transfer destination of the multicast packet received from said line interface, and a second field to store identification information of multiple line interfaces to transmit the multicast packet thereto, and a line interface indicated by the identification information of the multiple line interfaces in the second field of said multicast routing table is not limited to a line interface belonging to the virtual router which has received the multicast packet.

2. The packet relay device according to claim 1, wherein, the multicast packet received from the line interface is received by a first virtual router to which the line interface belongs, and not only the line interface belonging to the first virtual router but also a line interface belonging to a second virtual router different from the first virtual router transmits the multicast packet.

3. The packet relay device according to claim 1, wherein, a first virtual router to which the line interface belongs receives a multicast delivery request from a subscriber terminal, the request having been received from the line interface, and a multicast delivery request corresponding to said multicast delivery request is transmitted to a packet relay device being multicast upstream, from a line interface belonging to a second virtual router which is different from the first virtual router.

4. The packet relay device according to claim 3, wherein, the first virtual router to which the line interface belongs receives the multicast delivery request from the subscriber terminal, the request being received from the line interface, the multicast group address in the first field of said upstream virtual router information according to claim 1 and a multicast group address included in said multicast delivery request are compared and referred to, and a multicast delivery request equivalent to said multicast delivery request is transmitted to the packet relay device being multicast upstream, from a second virtual router indicated by the second field associated with the first field whose multicast group address matches the one included in said multicast delivery request.

5. The packet relay device according to claim 3, wherein, the first virtual router to which the line interface belongs receives the multicast delivery request from the subscriber terminal, the request being received from the line interface, a multicast group address in a first field of said upstream virtual router information according to claim 1 and a multicast group address indicated by said multicast delivery request are compared and referred to, a second virtual router is selected, which is indicated by a second field associated with the first field whose multicast group address matches the one included in said multicast delivery request, and a multicast routing protocol processing is performed in the second virtual router.

6. The packet relay device according to claim 4, wherein, the first virtual router to which the line interface belongs receives the multicast delivery request from the subscriber terminal, the request being received from the line interface, the second virtual router thus selected is notified of said multicast delivery request and an identifier of said line interface, and the identifier of the line interface is registered in the second field associated with the multicast address indicated by the first field of the multicast routing table in the second virtual router.

7. The packet relay device according to claim 1, further comprising a virtual line interface and a line within the device which establish connection among the multiple virtual routers, wherein the multicast packet is transferred among the multiple virtual routers via the virtual line interface and the line.

8. The packet relay device according to claim 1, further comprising a virtual line interface and a line within the device which establish connection among the multiple virtual routers, wherein a multicast delivery request is transferred from a subscriber terminal among the multiple virtual routers via the virtual line interface and the line.

9. A packet relay device in which a function of multiple virtual routers is implemented to transmit a multicast packet, comprising:

an interface to send and receive the packet;

a processor to perform a predetermined processing to the packet being received in order to transmit the packet to multiple line interfaces; and a memory which stores software to execute said predetermined processing, wherein, one of said multiple virtual routers receives the multicast packet that reached the device, the multicast packet that reached said device is transferred to each of the multiple virtual routers including the virtual router which has received the multicast packet, said multicast packet is transmitted from each of the virtual routers, to which the multicast packet has been transferred, to the outside of the device, and a line interface indicated by identification information of said multiple line interfaces is not limited to a line interface belonging to said one virtual router which has received the packet.

10. A packet relay device which performs multicast transmission of a multicast packet having been received, by using multiple virtual routers implemented in the device, comprising:

an interface which sends and receives the packet;

a processor which performs a predetermined processing to the packet thus received in order to transmit the packet to multiple line interfaces; and a memory which stores software to execute the predetermined processing, wherein, when the packet being subjected to the multicast transmission is received by the device, one of the virtual routers receives the packet, and a line interface indicated by identification information of said multiple line interfaces is not limited to a line interface belonging to said one virtual router which has received the packet.

* * * * *

UNITED STATES PATENT AND TRADEMARK OFFICE
CERTIFICATE OF CORRECTION

| | | |
|---|---|---|
| PATENT NO. | : 7,751,394 B2 | Page 1 of 1 |
| APPLICATION NO. | : 11/030101 | |
| DATED | : July 6, 2010 | |
| INVENTOR(S) | : Takihiro et al. | |

It is certified that error appears in the above-identified patent and that said Letters Patent is hereby corrected as shown below:

On the title page, Item [73] please delete:

"Hitachi Communication Technologies, Ltd."

and insert:

--Hitachi, Ltd.--

Signed and Sealed this
Fourteenth Day of October, 2014

Michelle K. Lee
*Deputy Director of the United States Patent and Trademark Office*